(12) United States Patent  
Gies

(10) Patent No.: US 9,047,291 B2  
(45) Date of Patent: Jun. 2, 2015

(54) SYSTEMS AND METHODS FOR SAVING AND APPLYING USER-SPECIFIED FILE NAMING CONVENTIONS

(75) Inventor: Edward Michael Gies, Beavercreek, OH (US)

(73) Assignee: Elsevier, Inc., New York, NY (US)

( * ) Notice: Subject to any disclaimer, the term of this patent is extended or adjusted under 35 U.S.C. 154(b) by 0 days.

(21) Appl. No.: 13/476,199

(22) Filed: May 21, 2012

(65) Prior Publication Data

US 2012/0290625 A1 Nov. 15, 2012

Related U.S. Application Data

(63) Continuation of application No. 11/657,781, filed on Jan. 24, 2007, now Pat. No. 8,195,715.

(60) Provisional application No. 60/762,701, filed on Jan. 27, 2006.

(51) Int. Cl.  
*G06F 17/30* (2006.01)

(52) U.S. Cl.  
CPC ................................ *G06F 17/30067* (2013.01)

(58) Field of Classification Search  
None  
See application file for complete search history.

(56) References Cited

U.S. PATENT DOCUMENTS

| | | | | |
|---|---|---|---|---|
| 2001/0056434 | A1* | 12/2001 | Kaplan et al. | 707/104.1 |
| 2002/0065136 | A1* | 5/2002 | Day | 463/42 |
| 2004/0201778 | A1* | 10/2004 | Risheq | 348/505 |
| 2004/0230966 | A1* | 11/2004 | Morris et al. | 717/169 |
| 2005/0063009 | A1* | 3/2005 | Ehara et al. | 358/1.16 |
| 2005/0210009 | A1* | 9/2005 | Tran | 707/3 |

* cited by examiner

*Primary Examiner* — Syed Hasan  
(74) *Attorney, Agent, or Firm* — Dinsmore & Shohl LLP

(57) ABSTRACT

In one aspect, the invention comprises software stored in a computer readable medium, comprising: (a) software for receiving a user-specified file naming convention; (b) software for electronically storing said file naming convention; (c) software for detecting whether a file has been selected for download; and (d) software for displaying a default file name for said file, wherein said default file name is constructed based on said file naming convention.

18 Claims, 9 Drawing Sheets

Data Flow of PDF Renaming

○ Use System Default PDF Naming: <FirstAuthor>_<Second Author>_<Year>_<Volume>_<Issue>.pdf
⦿ When saving your PDFs, include the following in the PDF file name:

Possible File Naming Bits:
| First Author Name |
| Second Author Name |
| Third Author Name |
| Author Keywords |
| Journal Name |
| Publication Year |
| Volume |
| Issue |
| Pages |
| doi |

>>

Include in File Name:
| First Author Name |
| Second Author Name |
| Third Author Name |
| Publication Year |

[Remove] [Move Up] [Move Down]

Select Separator: [_ (Underscore) ▼]

☑ Include My Own [Prefix ▼]: [neurology]

File Name Preview:
neurology_<first_author>_<second_author>_<third_author>__<Year>.pdf

[Save] [Cancel]

FIG. 8

SYSTEMS AND METHODS FOR SAVING AND APPLYING USER-SPECIFIED FILE NAMING CONVENTIONS

CROSS-REFERENCE TO RELATED APPLICATIONS

This application claims the benefit of U.S. patent application Ser. No. 11/657,781 filed Jan. 24, 2007 and U.S. Provisional application 60,/762,701 filed Jan. 27, 2006. The entire contents of both applications are incorporated herein by reference.

BACKGROUND AND SUMMARY

In one embodiment, the present invention involves a World Wide Web ("Web") application that allows a user to specify a particular file naming convention for files downloaded by the client browser. A user may specify any combination of database stored document attributes (e.g., author, title) when setting file naming conventions. For illustration purposes, the particular Web application discussed herein is ScienceDirect, which is geared towards searching and retrieving peer-reviewed scientific papers.

An exemplary embodiment allows a user to specify one or more naming conventions for Adobe PDF (Portable Document Format) files. However, this invention is sufficiently general to teach and encompass saving of a naming convention for any file type that is downloaded or saved by a Web browser or desktop application (or similar contexts, such as FTP downloads).

A common approach to organizing files within a desktop software environment is to apply a consistent file naming convention that will facilitate scanning and recognition. Currently, users must either type in desired file name portions (bits) at download time or save a file to the desktop and then rename the file, both of which are labor intensive. With the present invention, the user's system applies one or more user-specified file naming conventions to a downloaded file.

The Web contains many applications geared for various activities such as work, recreation, news, and shopping. Within a Web application it is a common task to download/open a particular document from within the client Web browser. This is most commonly done by selecting a hyperlink to initiate a file download (see FIG. 1). Documents that are downloaded can be of various file types, including but not limited to .PDF (Portable Document Format), .txt (Text File), and .doc (Microsoft Word File). For the purposes of this invention, a user may download, and simultaneously save and rename, a file from within the Web browser in at least 4 different ways:

(1) Select a hyperlink to the file using a mouse or keyboard. The client will either launch an associated application/viewer (e.g., Adobe Acrobat Reader) or will bring up a file download dialogue box if the file type is not recognized. If an application/viewer is launched, the user may save and rename the file with a browser menu command (see FIG. 2). Examples of the browser save/rename function are "Save As" (in Internet Explorer) and "Save Page As" (in Mozilla Firefox). If the Windows file download is launched, the user may also save and rename the file.

(2) Select the hyperlink using the mouse or keyboard and the correct application is launched. The user may then save and rename the file directly from within the application. For example, Adobe Acrobat provides a "Save a Copy" menu item (see FIG. 3).

3) From within the Web browser, the user may save and rename the file by right-clicking on the download hyperlink and selecting "Save Target As" (in Internet Explorer) or "Save File As" (in Mozilla Firefox). (Right-clicking is used in the Windows operating system.) See FIG. 4.

4) The user may also save and rename the file by typing the URL of the file into the browser address bar. See FIG. 5.

There is not an automatic method available today to override the static file name that is specified by the Web application. To apply a custom file name that meets a particular user's needs, the user must manually type in or paste text into the Windows Save As or Rename File dialogue box. The old manual way of renaming PDF or other files requires a user to perform the following labor-intensive steps each time the user downloads an article:

1) Recalling what format the user's preferred naming convention is for the particular file. This may involve opening Windows Explorer and browsing to the previously stored documents to determine how the user has previously named other files.

2) Extracting and applying the relevant pieces of information to be used in the file name. This would be accomplished by either a copy/paste method or by manually typing the bits into the file name.

Some products use a default PDF naming convention, but the convention is system-generated and a user is not allowed to change the setting. FIGS. 6 and 7 illustrate two different default file naming conventions. Blackwell Synergy uses the digital document identifier (doi) as the default naming convention. See FIG. 6. The ACM uses the first page number and the first author last name in the default file naming scheme. See FIG. 7.

Many Web sites allow users to save personal preferences for the site (or application) using two main approaches: (a) user logs in with a user name and password and then saves the user's preferences to an application database; or (b) certain information about the user is stored in a browser cookie (allowing the user to skip all or part of the log-in process). If a client browser is set to accept cookies, cookies may be used to store information about the user that is meant to be applied at a later time to benefit the user—for instance, to remember a user's user ID so that the user does not have to retype the user's ID at each login.

In one embodiment, the present invention capitalizes on the ability of a user's preferences to either be saved in an application database or in the form of a cookie.

One goal of the invention is to ease the burden of Website users who repeatedly download files of a particular file type and rename those files for organization and/or recall purposes. In one particular embodiment, the invention is applied to ScienceDirect, a Web application for searching and retrieving scientific papers in PDF format. This embodiment allows a user to save the user's preferred file naming convention to the Web application database or with a cookie. Later, when the user downloads a file, the Web application will apply the saved naming convention to the downloaded file. An example of a PDF or file naming convention that a user may find useful is:

<first author last name>_<second author last name>_<article title>_<year of publication>.PDF Because different users organize their files in different ways, there is not a one size fits all solution to file naming. This invention provides a user with flexibility in terms of how downloaded files are named. A user who uses one or more embodiments of the present invention can save time by not having to manually apply the user's preferred file naming convention each time a file is downloaded.

In one aspect, the invention comprises software stored in a computer readable medium, comprising: (a) software for receiving a user-specified file naming convention; (b) software for electronically storing said file naming convention; (c) software for detecting whether a file has been selected for download; and (d) software for displaying a default file name for said file, wherein said default file name is constructed based on said file naming convention.

In various embodiments: (1) said file naming convention is to be applied to .pdf files; (2) said file naming convention is to be applied to .doc files; (3) said file naming convention is stored in a cookie; (4) said file naming convention is stored in a database; (5) the invention further comprises software for displaying a graphic user interface on a computer screen; (6) said graphic user interface comprises selection means operable to enable a user to select an option to customize a file naming convention; (7) said graphic user interface comprises selection means operable to enable a user to select desired file naming bits; (8) said graphic user interface comprises means operable to enable a user to input desired words to be used in said file naming convention; (9) said graphic user interface comprises means operable to enable a user to input desired characters to be used between words in said file naming convention; (10) said file naming convention is specified by a system administrator; and (11) said graphic user interface comprises means operable to enable a user to specify an order of file naming bits of said file naming convention.

BRIEF DESCRIPTION OF THE DRAWINGS

Figure 1:
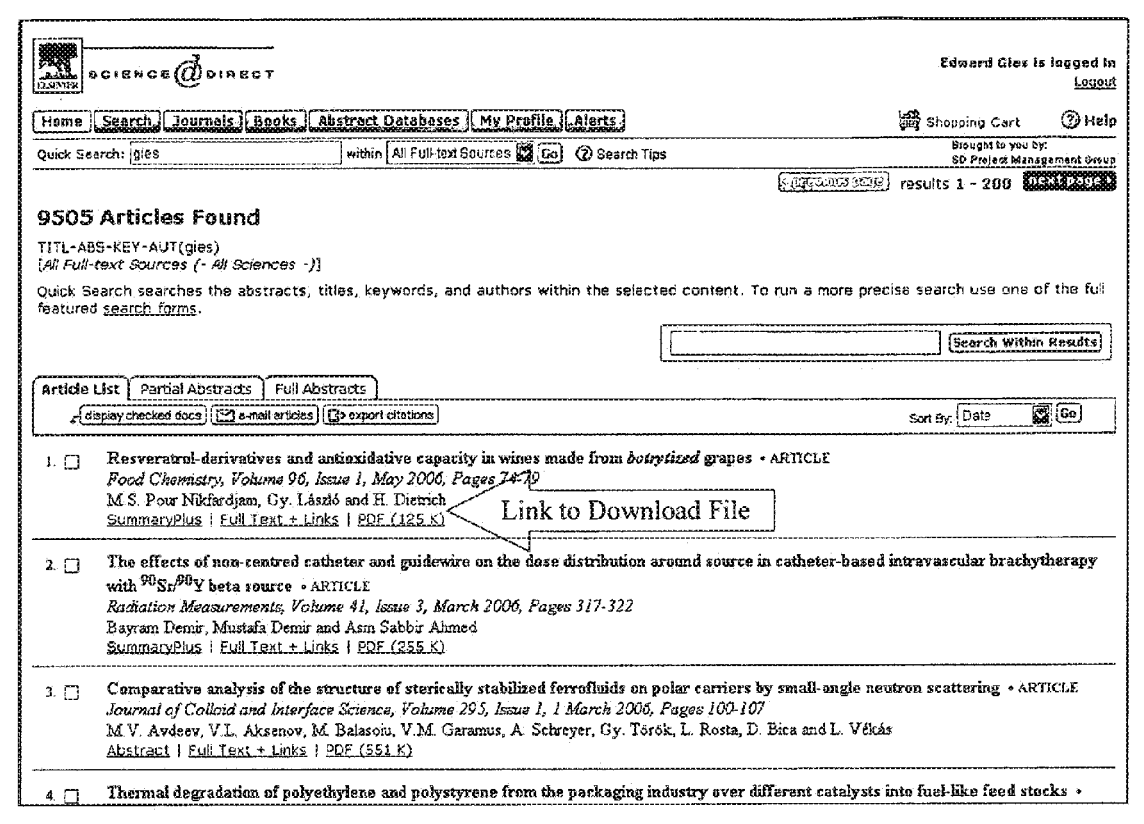

FIG. 1 depicts an example of a hyperlink within the ScienceDirect Web application.

Figure 4:
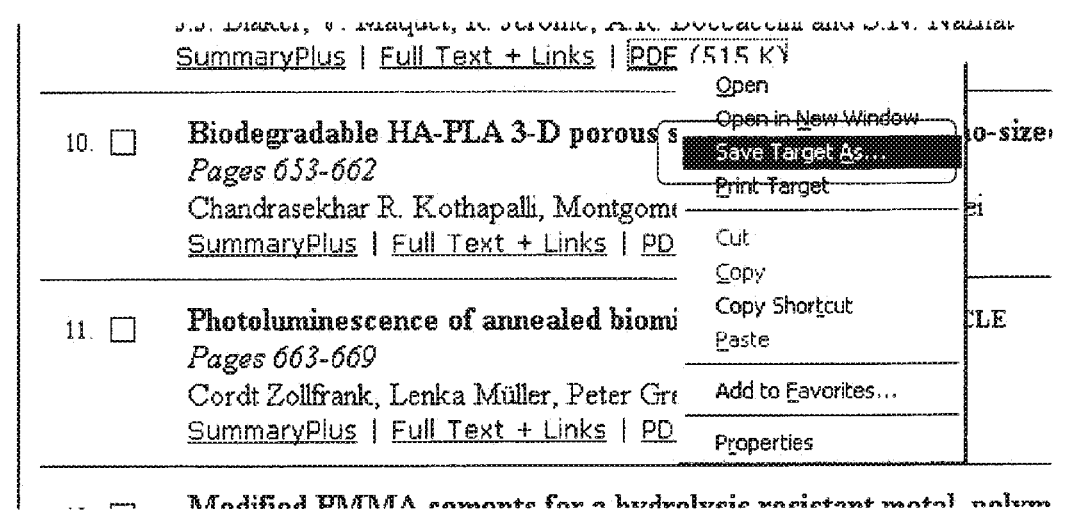

FIG. 4 shows "Save Target As . . . " appearing in a command menu after right-clicking on a hyperlink.

FIG. 8 depicts an exemplary PDF naming conventions user interface.

DETAILED DESCRIPTION OF CERTAIN EMBODIMENTS OF THE INVENTION

Figure 2:
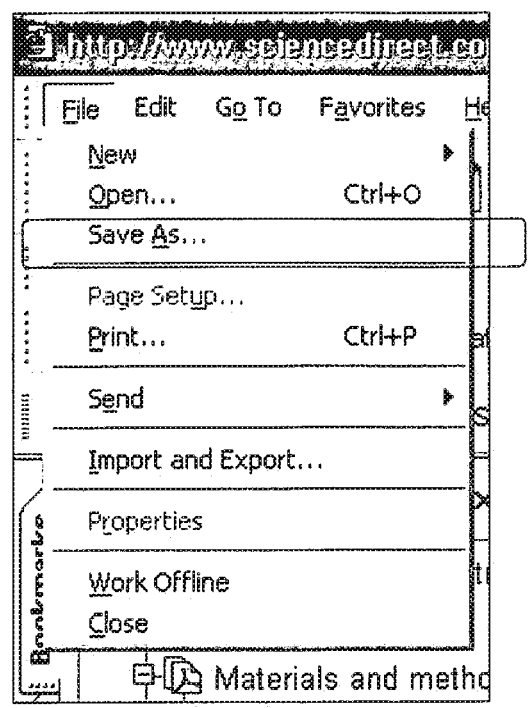
FIG. 2 illustrates saving a file through a "File–> Save As . . . " menu selection in a Web browser.
Figure 3:
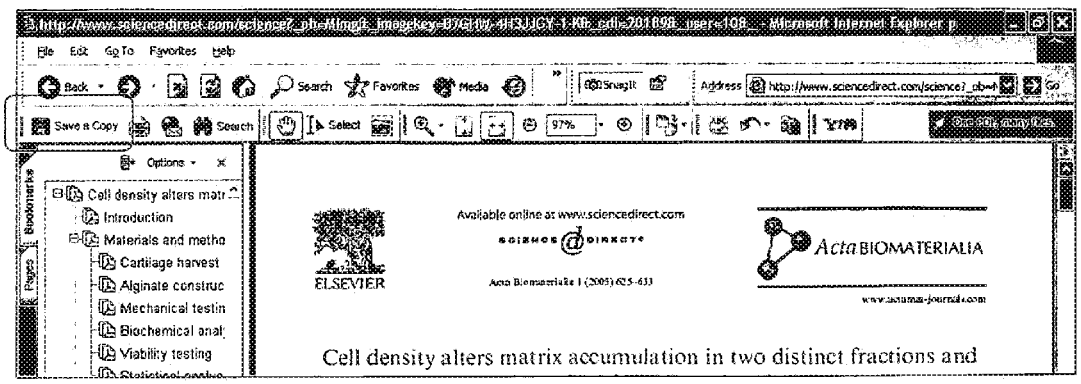
FIG. 3 illustrates the ability of a file's native application to save a file. (This example is Adobe Acrobat Reader).
Figure 5:
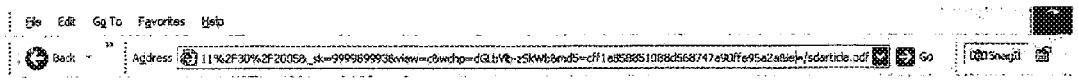
FIG. 5 shows how a user may open a file by typing or pasting a URL into a browser address bar.
Figure 6:
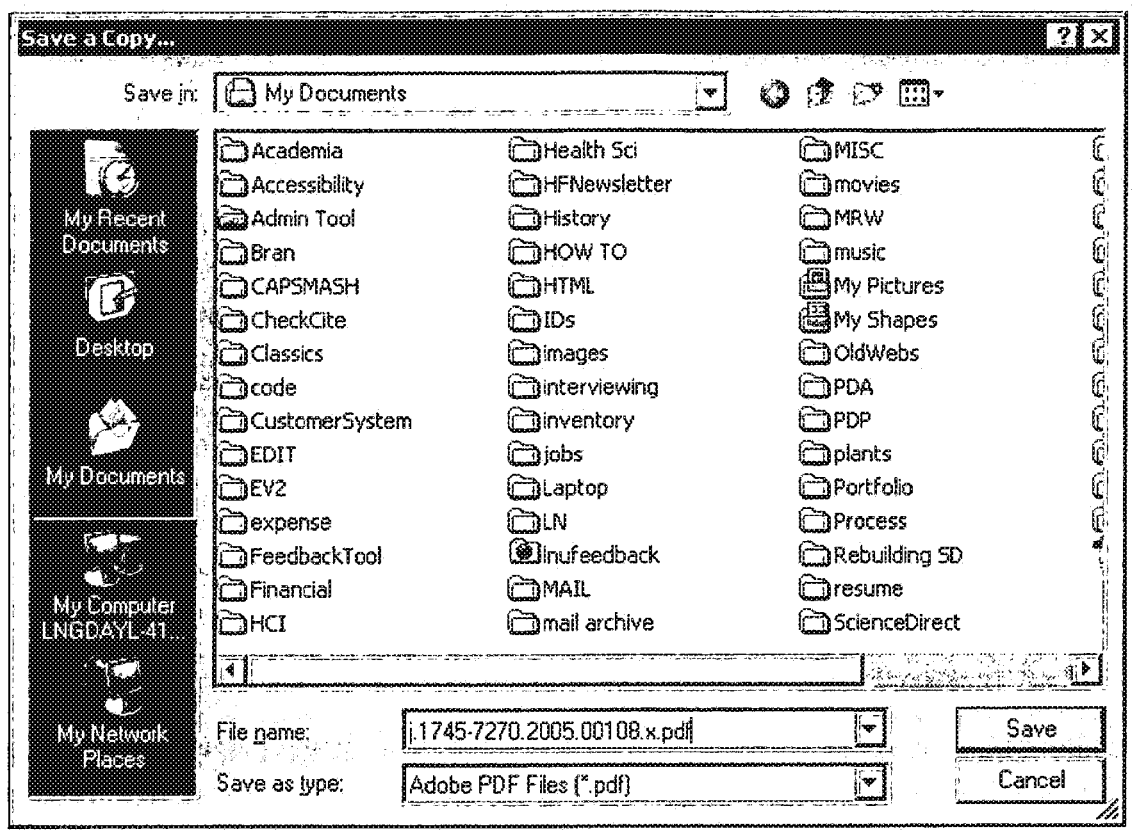
FIG. 6 depicts how Blackwell Synergy uses the doi as the default PDF file name.
Figure 7:
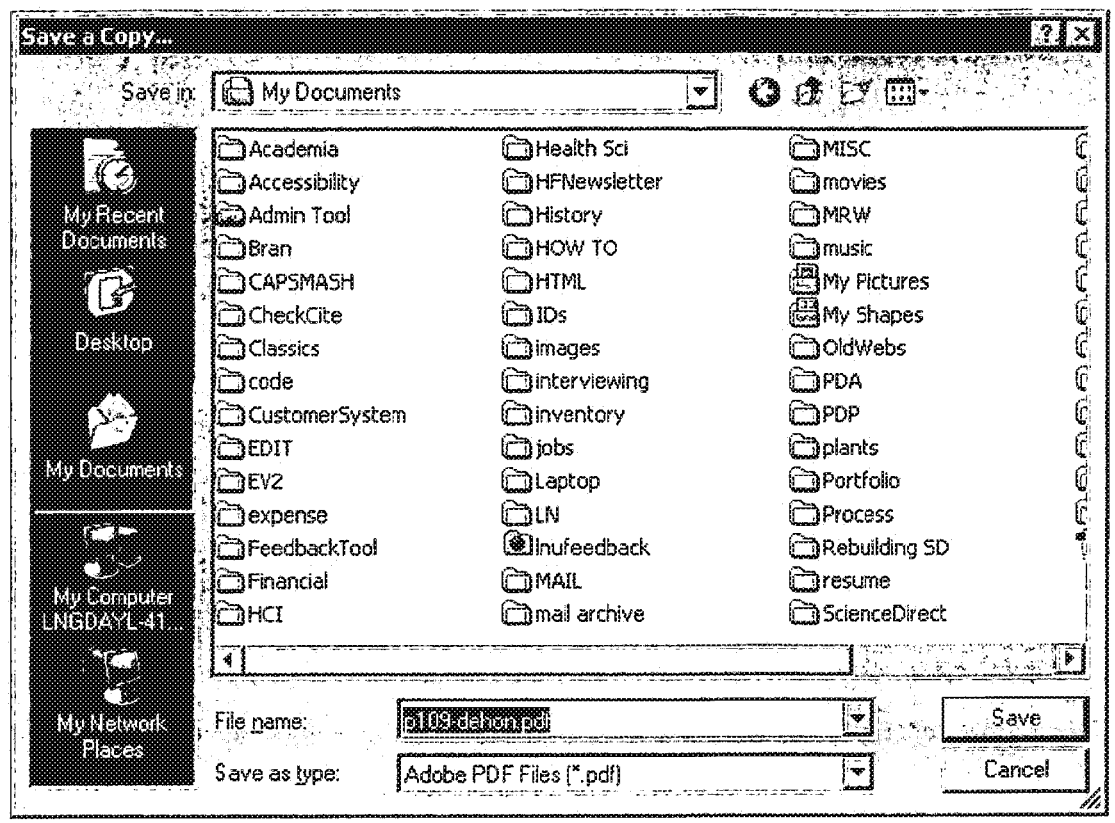
FIG. 7 depicts how the ACM Digital Library uses a static convention of "p<Article Start Page Number>-<First Author Last Name>.pdf."

Embodiments of this invention provide users with a user interface to save and apply file naming conventions for files downloaded within a Web application. A naming convention may be supplied by either an application database or via a cookie, and may be constructed as a file name through the HTTP header. The technical details of how this information preferably is passed between the application and the client are in the Technical Description section below.

Depending upon the subject matter of the Website involved, there may be different sets of naming convention bits that are relevant. ScienceDirect houses scientific, peer-reviewed literature and users need to keep track of document information, which is often used later for citation and referencing purposes. In this domain and most other scholarly research domains where PDFs are used, there is a typical set of naming attributes that may be used to name the PDF file.

The table below lists some of the different article attributes that may be useful to a user in naming a scientific paper PDF file:

TABLE 1

Example of Possible File Naming Bits Used in a Web application for Scientific Literature Search and Retrieval First Author Last (family) Name
Second Author Last (family) Name
Third Author Last (family) Name
Last Author Last (family) Name
Year of Publication
Volume
Issue
First Page Number
Last Page Number
User Defined Keywords
Author Keywords
Digital Object Identifier (DOI)
Full/Partial Article Title
Full/Partial Journal Name
Date of Download
Numerical Progression, e.g., 0, 1, 2 . . .

In a different subject area, such as architecture and building plan document files, the file naming bits might include:

TABLE 2

Example of File Naming Bits for an Architecture Document Retrieval Website

Architect Firm Name
Primary Architect Last (family) Name
Secondary Architect Last (family) Name
Architecture Style
Primary Construction Materials (e.g. Steel, brick)
Year of Completion
Building Code
Number of Stories
Height
Square Footage
Building Location (City)
Building Location (State/Province)
Building Location (Country)

User Interface Description

FIG. 8 depicts a preferred user interface from a Web application wherein a user is allowed to customize the user's PDF naming conventions. The first radio button set allows the user to either select the system default or to customize the PDF naming convention. The multi-select text box user interface for selecting the particular file naming bits is similar to the file transfer interface seen in FTP software such as WS_FTP Pro. The left side box ("Possible File Naming Bits") allows a user to select one or more pieces of information from a file and then use an arrow button to move the file naming bits over to the right box ("Include in File Name"), which shows the bits in the file naming convention. The user may also specify the order in which the file naming bits appear in the file name by using the "Move Up" and "Move Down" buttons. This interface also allows the user to include the user's own keywords in the prefix or suffix of the file name, (for example, in case the user is saving papers for a thesis and would like to have: thesis_<first author last name>_<journal name>).In addition, a user may specify a character that separates each file naming bit. The dynamic display of this interface preferably is based upon Javascript code.

Description of Preferred HTML Components

Use System Default PDF Naming/Specify

| | |
|---|---|
| Description | There will be radio buttons that determine whether or not to apply a user-defined PDF naming convention or to stick with the system default. |
| Defaults | The default will be to apply a system-defined PDF naming convention. |

Possible File Naming Bits multi-select box

| | |
|---|---|
| Description | This widget is a multi-select text box that allows a user to select one or more items. This box indicates which file naming bits are allowed to be selected as part of the file name. |
| Defaults | None of the items are selected. The select items are ordered alphabetically or may be ordered as determined by the business needs of the application. |

Arrow button

| | |
|---|---|
| Description | This button controls which file naming bits will be moved to the selected file naming bits. |
| User Action | Action: Select button<br>Response: Use Javascript to copy the selected items from the "Possible File Naming Bits" text box to the "Include in File Name" text box. |

Include in File Name multi-select box

| | |
|---|---|
| Description | This widget is a multi-select text box and indicates which file naming bits have been selected to be part of the PDF file name.<br>The order in which the items are displayed indicates the order in which the items will be displayed in the file name. |
| Defaults | None of the items are selected. The select items are ordered with the most recently added showing at the top of the list. |

Remove button 840

| | |
|---|---|
| Description | This button controls which file naming bits will be removed from the selected file naming bits. |
| User Action | Action: Select button<br>Response: Use Javascript to remove the selected items from the "Include in File Name" text box. |

Move Up button

| | |
|---|---|
| Description | This button allows a user to move an item down in the "Include in File Name" text box. |
| User Action | Action: Select one item in the text box and select button.<br>Response: Use Javascript to move the selected item up in position relative to the other file naming bits. |

Move Down button

| | |
|---|---|
| Description | This button allows a user to move an item up in the "Include in File Name" text box. |
| User Action | Action: Select one item in the text box and select button.<br>Response: Use Javascript to move the selected item down in position relative to the other file naming bits. |

Select Separator dropdown 850

| | |
|---|---|
| Description | This dropdown allows the user to specify the separator between the file naming bits. The select items may comprise:<br>1. No Separator<br>2. _ (Underscore)<br>3. - (Dash)<br>4. (Blank Space) |
| Defaults | No Separator |

Include My Own Prefix/Suffix widget set 860

| | |
|---|---|
| Description | This set is optional as indicated by the checkbox. This set allows the user to define either prefix or suffix to apply to the file name. |

Include My Own Prefix/Suffix checkbox

| | |
|---|---|
| Description | This checkbox allows the user to apply a prefix and/or suffix to the PDF file name. |
| Defaults | Not checked |

Prefix/Suffix dropdown

| | |
|---|---|
| Description | This dropdown allows the user to either select either the Prefix or Suffix. |
| Defaults | Nothing selected. |

Prefix/Suffix textbox

| | |
|---|---|
| Description | This dropdown allows the user specify a value for a Prefix or Suffix. Blank |
| Defaults | |

File Name Preview 870

| | |
|---|---|
| Description | This text displays a string that indicates both the file naming bits chosen by the user and the order in which they appear. Javascript preferably is used to control the dynamic display of this text string. |
| Defaults | Will default to indicate the system default. |

Save button

| | |
|---|---|
| Description | This button invokes the saving of the user's file naming conventions to the Web application. |
| User Action | Action: Select button.<br>Response: Save the settings to the application database. |

Technical Description

Upon loading of a Web page that contains a link to a file to be downloaded, the Web application will construct a hyperlink for each file that may be downloaded by the user. For example, in ScienceDirect, the user may be looking at a search result that contains links to PDF articles (see FIG. 1). The link to each article will contain information the application will use in order to gather and construct a filename when the user selects the link. The filename preferably will be constructed according to the highest priority naming convention (see FIG. 9). If the user has logged in, the Web application will perform a check to see whether the user has customized the user's PDF—(or, more generally, file—) naming conventions. There will also be a check to see whether a cookie has stored a machine-specific PDF naming convention. If either check shows that a user has set one or more file naming conventions, then the Web application will create the PDF file name. The PDF file name may be created by: (a) sending the appropriate file name via the HTTP header (most likely through Content-Disposition) when the user clicks on the link (e.g.: Content-Disposition: attachment; filename=<put filename here> in the HTTP header); or (b) constructing the name in the URL, where the URL is a path-only URL (e.g.: www.sciencedirect.com/science/S90809832435/gies_Journal_of_Colloid_and_Interface_Science.PDF, which would name the PDF:
gies_Journal_of_Colloid_and_Interface_Science.PDF (assuming the content disposition tag wasn't used)).

If no naming convention has been set by the user, a system default may be used by the Web application.

The two preferred ways for passing the file name are described herein because different browsers may support one solution better than another. The Web application will detect which browser is used by the client and provide the more functional solution.

Figure 9:
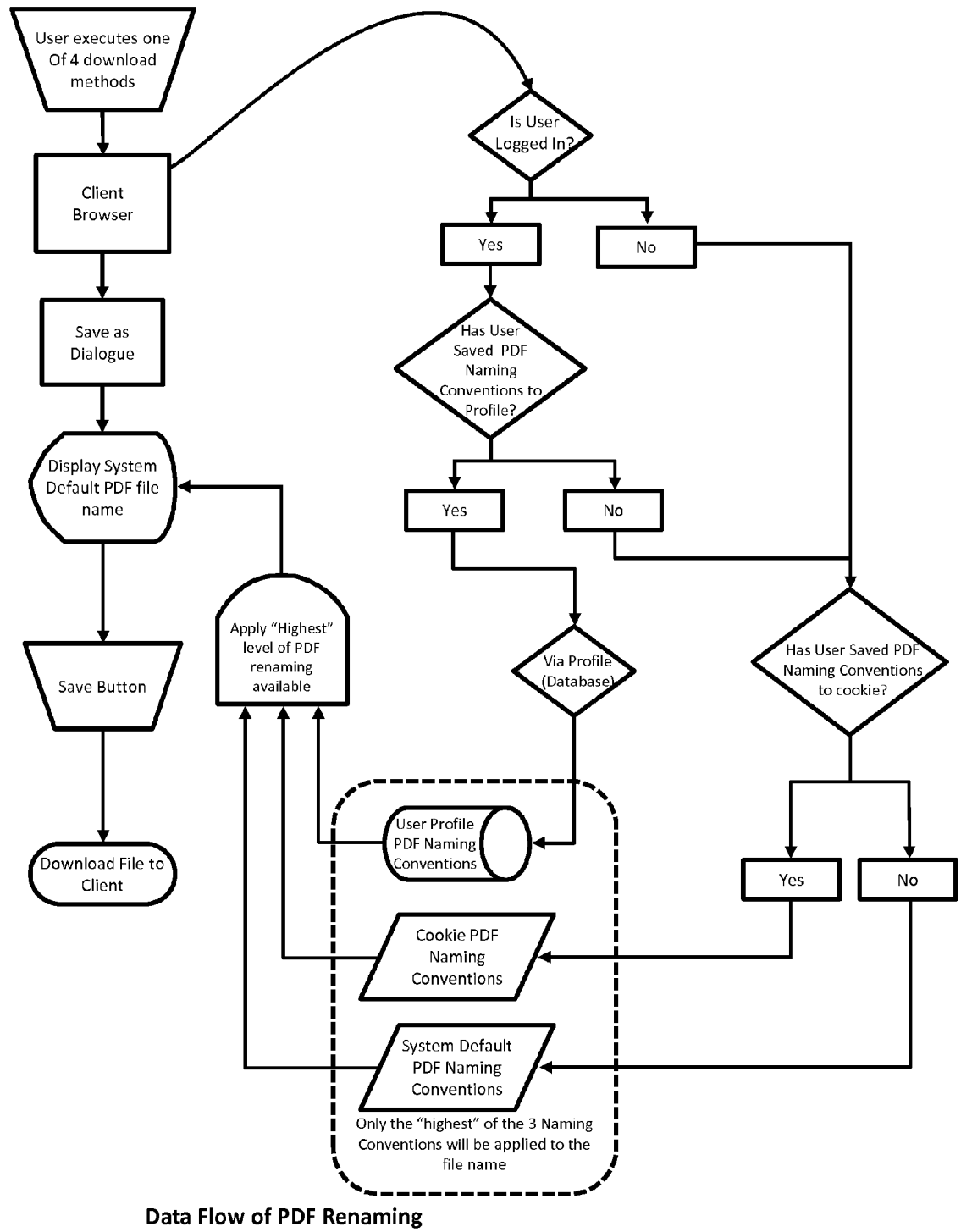
FIG. 9 is a flowchart showing exemplary data flow for PDF renaming.

FIG. 9 depicts exemplary data flow for PDF renaming software. The most significant depicted steps are discussed above. In at least one embodiment, the software preferably applies the highest appropriate level of PDF naming. At the lowest level, there has not yet been a PDF naming convention applied by the user, and the system will apply the default. The second level is applied when a cookie supplies the file naming. The third level is applied when the user's file naming conventions have been saved to the user's profile.

Further Embodiments

The file renaming software has been described above in conjunction with a Web application, but may also be implemented as a desktop software application. A (PC) desktop application that stores relevant file attributes in a database may allow a user to automatically apply a preferred file name to the user's selected file(s). A network of computers connected to the same back end may allow all users to benefit from the same database of file naming bits.

A desktop application may allow for multiple file downloads and renaming as selected by the user. Such an application benefits users who: (1) have never organized a set of local files and would like to apply a consistent naming scheme; and/or (2) need to see specific file attributes in a Windows Explorer view. For example, an author creating a References section may choose to rename all referenced files so that the user can see all relevant citation information within Windows Explorer.

A side benefit of being able to bulk rename files is the ability to convert a bunch of files from one type/extension to a different type/extension. If a user kept daily diary notes in a .txt document and later wanted the notes to be in Microsoft Word (.doc format), the user can select all of the files and then convert them from .txt to .doc in one action.

Another embodiment of the present invention is related to FTP software. During an FTP session, a user may apply a preferred file naming convention to a set of files to be downloaded or uploaded.

While particular elements, embodiments, and applications of the present invention have been shown and described, it should be understood that the invention is not limited thereto, since modifications may be made by those skilled in the art, particularly in light of the foregoing teaching. The appended claims are intended to cover all such modifications that come within the spirit and scope of the invention.

I claim:

1. A computer-program product comprising non-transitory computer readable storage medium storing instructions that, when executed by a computer, cause the computer to:
    display, on a display, a graphic user interface that requests a user-specified file naming convention, wherein said user-specified file naming convention comprises a plurality of user-specified file naming bits;
    if said user-specified file naming convention is received, store said user-specified file naming convention across a plurality of sessions;
    detect whether a file has been selected for download from a remote site in communication through public access servers in accordance with an established linking transmission protocol; and
    display, on the display, a default file name for said file when said file is detected, wherein:
        said default file name is constructed based on said user-specified file naming convention if said user-specified file naming convention is received such that a plurality of attributes of said file are displayed within said plurality of user-specified file naming bits;
        said default file name is constructed based on a cookie defined naming convention if said user-specified file naming convention is not received and said cookie defined naming convention is stored; and
        said default file name is constructed based on a system default naming convention if no user-specified file naming convention is received and no cookie defined naming convention is stored.

2. The computer-program product as claimed in claim 1, wherein said file naming convention is to be applied to .pdf files.

3. The computer-program product as claimed in claim 1, wherein said file naming convention is to be applied to .doc files.

4. The computer-program product as claimed in claim 1, wherein said file naming convention is stored in a database.

5. The computer-program product as claimed in claim 1, wherein said graphic user interface displays a list of possible file naming bits for user-selection, said list of possible file naming bits corresponding to a list of possible attributes of said file.

6. The computer-program product as claimed in claim 5, wherein said plurality of user-specified file naming bits of said user-specified file naming convention is selected from said list of possible file naming bits.

7. The computer-program product as claimed in claim 1 wherein said graphic user interface enables a user to input desired words to be used in said file naming convention.

8. The computer-program product as claimed in claim 1, wherein said graphic user interface enables a user to input desired characters to be used between words individual user-specified file naming bits of said plurality of user-identified file naming bits in said file naming convention.

9. The computer-program product as claimed in claim 1, wherein said graphic user interface enables selection of an order of individual user-specified file naming bits of said plurality of user-specified file naming bits.

10. The computer-program product as claimed in claim 1, wherein said linking transmission protocol is TCP/IP.

11. The computer-program product as claimed in claim 1, wherein said plurality of possible file naming bits comprises one or more of the following: a first author name, a second author name, a third author name, a journal name, a publication year, a volume, an issue, and pages.

12. A computer implemented method, comprising:
    receiving, by a computer, a request to save an electronic document to a non-transitory memory;
    determining a naming convention to be applied to said electronic document, wherein said naming convention is selected from a group of conventions comprising:
        a user profile defined naming convention;
        a cookie defined naming convention wherein said cookie defined naming convention comprises a cookie operable to store data associated with a machine-specific naming convention; and
        a system default naming convention, wherein:
            if a user profile defined naming convention is stored, said user profile defined naming convention is determined as said naming convention;
            if a cookie defined naming convention is stored and a user profile defined naming convention is not stored, said cookie defined naming convention is determined as said naming convention; and
            if neither a user profile defined naming convention nor a cookie defined naming convention is stored, then said system default naming convention is determined as said naming convention; and
    constructing, by said computer, a default file name for said electronic document based on said naming convention.

13. The computer implemented method as claimed in claim 12, wherein each of said user profile defined naming convention, said cookie defined naming convention, and said system default naming convention comprises one or more bits that correspond to one or more attributes of said electronic document.

14. The computer implemented method as claimed in claim 12, further comprising displaying, on said display, a graphic user interface.

15. The computer implemented method as claimed in claim 14, wherein said graphic user interface displays a list of possible file naming bits for user-selection, said list of possible file naming bits corresponding to a list of possible attributes of said electronic document.

16. The computer implemented method as claimed in claim 15, wherein said plurality of user-specified file naming bits of said user profile defined naming convention is selected from said list of possible file naming bits.

17. The computer implemented method as claimed in claim 14, wherein said graphic user interface enables a user to input desired characters to be used between individual user-specified file naming bits of said plurality of user-identified file naming bits in said file naming convention.

18. The computer implemented method as claimed in claim 14, wherein said graphic user interface enables selection of an order of individual user-specified file naming bits of said plurality of user-specified file naming bits.

* * * * *